Aug. 20, 1935.   R. SLAWICK   2,012,111
ACCOUNTING MACHINE
Filed Dec. 30, 1931   6 Sheets-Sheet 1
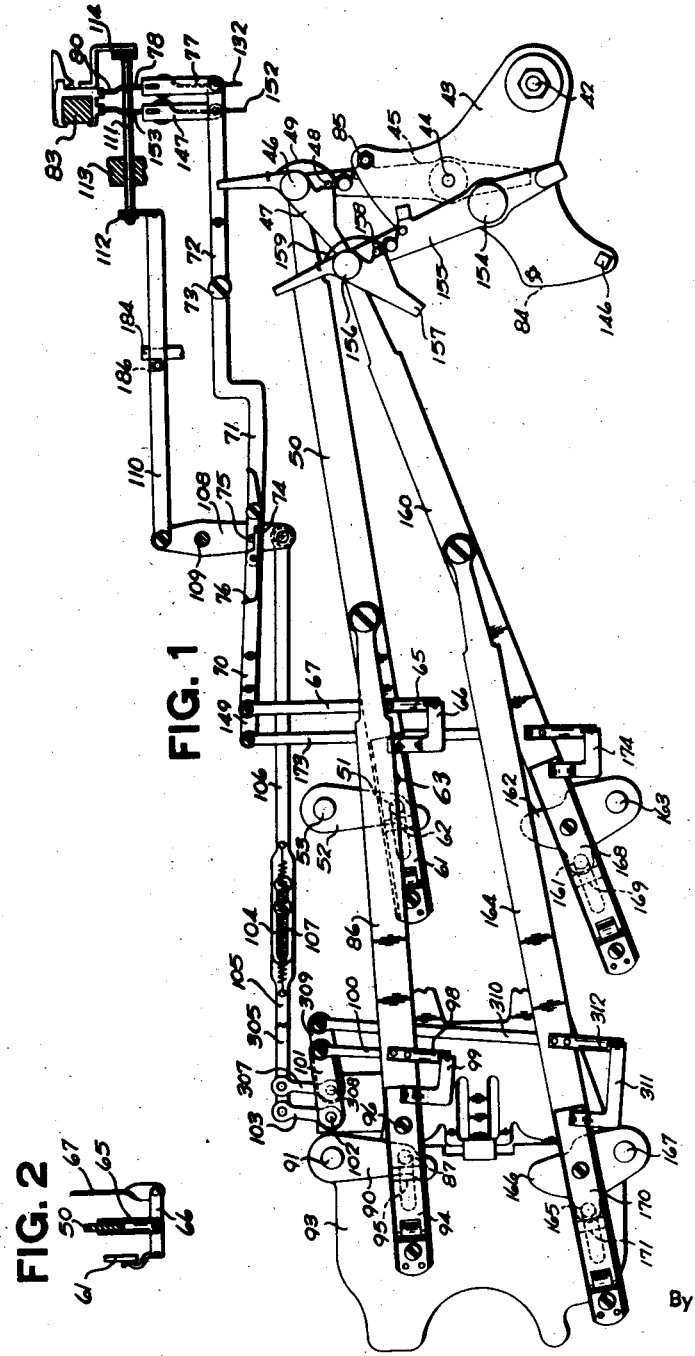
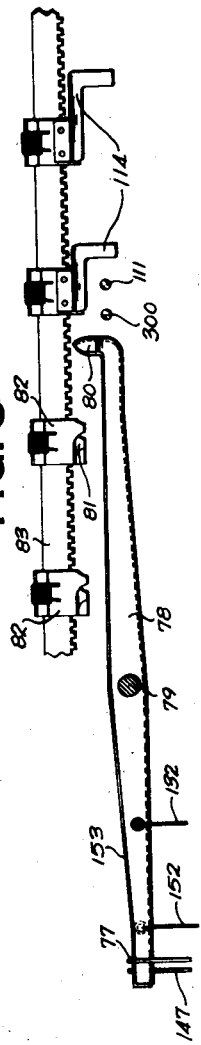
Inventor
Rudolf Slawick
By Earl Benst
His Attorney Aug. 20, 1935.   R. SLAWICK   2,012,111
ACCOUNTING MACHINE
Filed Dec. 30, 1931   6 Sheets-Sheet 2

Inventor
Rudolf Slawick
By Earl Beust
His Attorney

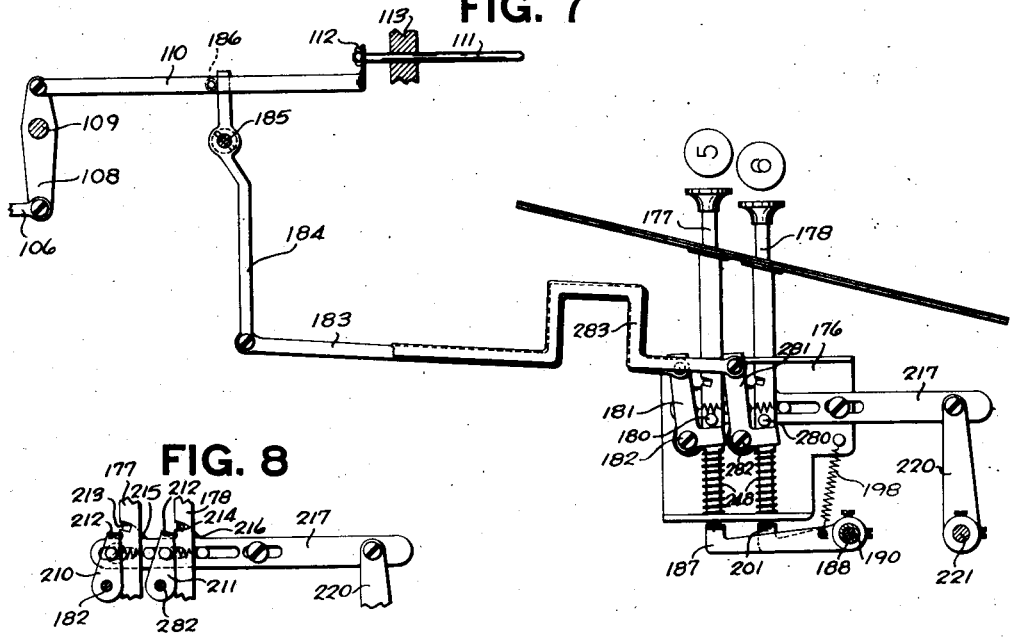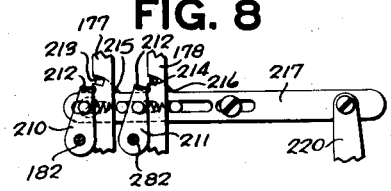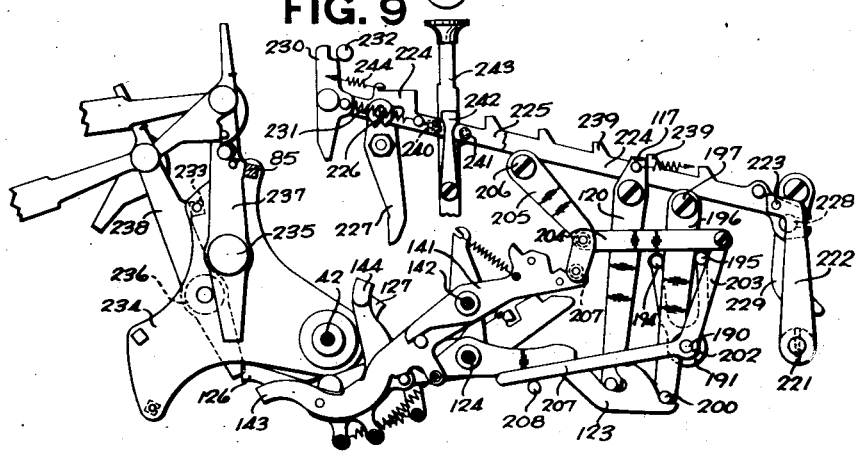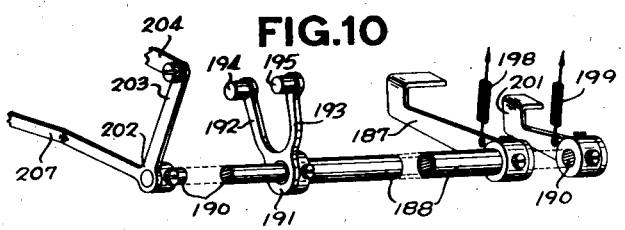

Aug. 20, 1935.   R. SLAWICK   2,012,111
ACCOUNTING MACHINE
Filed Dec. 30, 1931   6 Sheets-Sheet 4
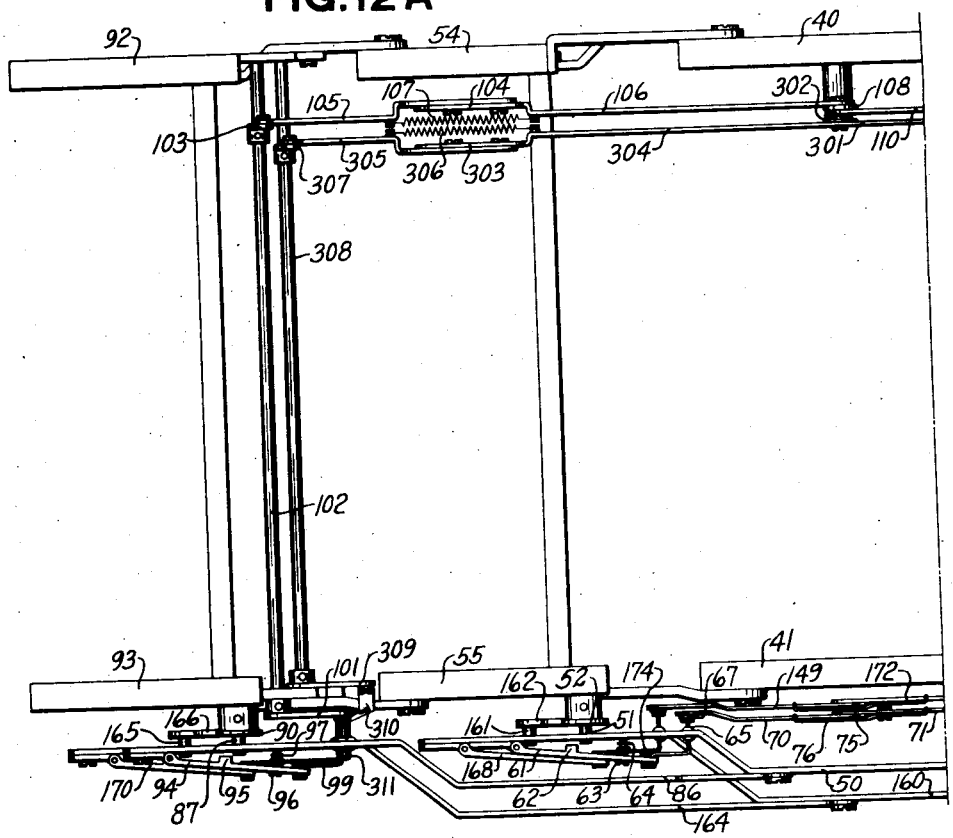
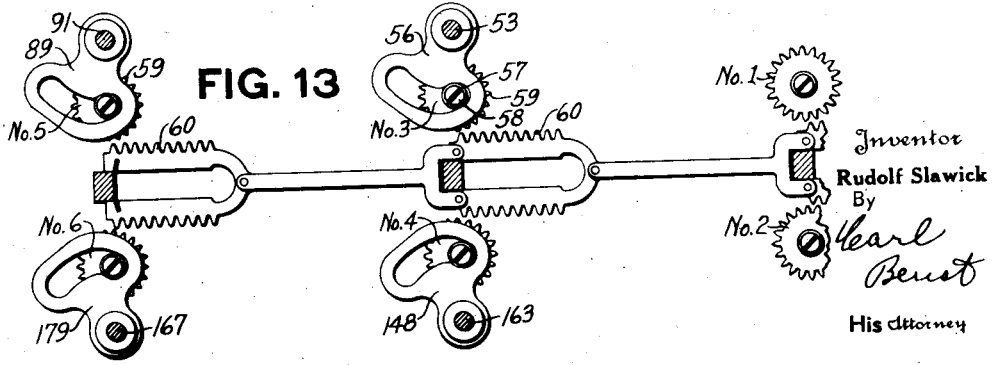

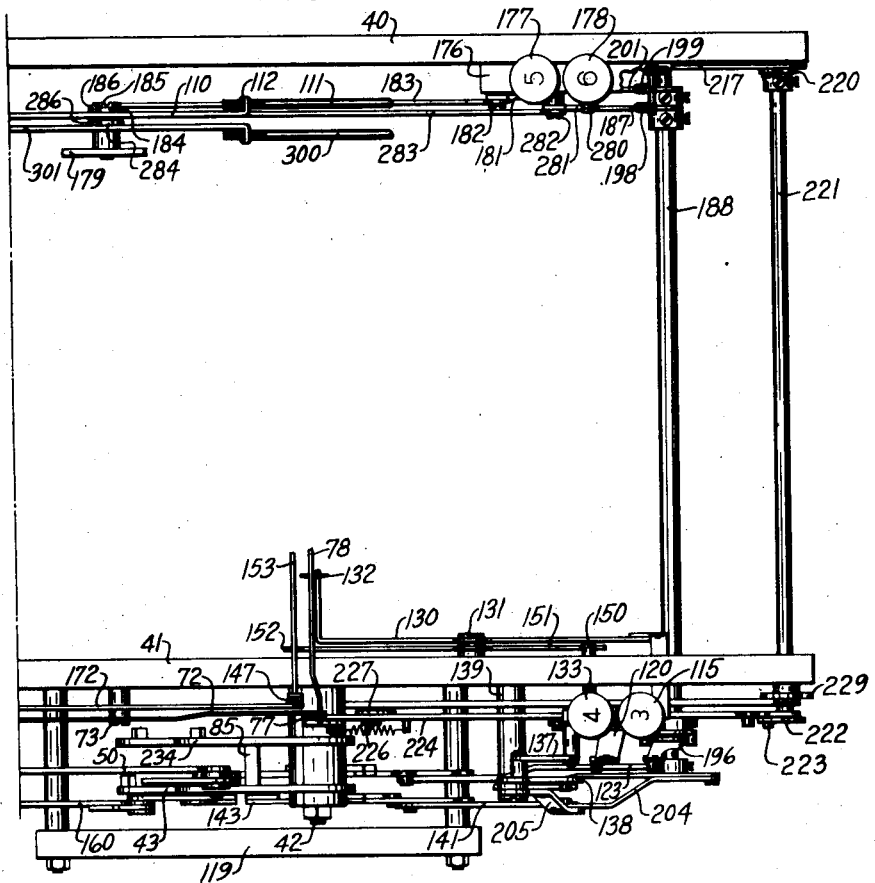

Aug. 20, 1935.    R. SLAWICK    2,012,111
ACCOUNTING MACHINE
Filed Dec. 30, 1931    6 Sheets-Sheet 6

Inventor
Rudolf Slawick
By
*Carl Benst*
His Attorney

Patented Aug. 20, 1935

2,012,111

UNITED STATES PATENT OFFICE 2,012,111

ACCOUNTING MACHINE

Rudolf Slawick, Prague, Czechoslovakia, assignor to The National Cash Register Company, Dayton, Ohio, a corporation of Maryland Application December 30, 1931, Serial No. 583,903
In Czechoslovakia January 8, 1931

2 Claims. (Cl. 235—60)

This invention relates to accounting or bookkeeping machines of the well known Ellis type, such as are illustrated and described in Letters Patent of the United States, Nos. 1,197,276 and 1,197,278, issued September 5, 1916 to Halcomb Ellis, Patent No. 1,203,863, granted November 7, 1916 to Halcomb Ellis, and Patent No. 1,819,084, issued August 18, 1931 to Emil John Ens.

It is an object of this invention to provide an Ellis type machine with six totalizers.

Another object is to supply means for selectively coupling the engaging means of any number of a plurality of totalizers with a common operating means.

Another object is to furnish means for controlling the selective coupling means in additive and total-taking operations.

Still another object is to provide novel means in connection with the traveling carriage for operating the selective coupling means in adding operations.

A further object is to furnish means whereby the selective coupling means is made effective by key means in totalizing operations.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings Fig. 1 is a side elevation as observed from the left of the machine, showing the totalizer engaging mechanisms for the No. 3, No. 4, No. 5 and No. 6 totalizers, and the method used to selectively couple said engaging mechanism to the operating means.

Fig. 2 is a detail view showing a portion of a selective coupling latch.

Fig. 3 is a view illustrating the traveling carriage tabulating bar, with a plurality of stops mounted thereon, and two hanging bar levers.

Fig. 7 is a view of the No. 5 and No. 6 total keys, showing the means for connecting said total keys to the totalizer selecting mechanism.

Fig. 8 is a detail of the latch mechanism for the No. 5 and No. 6 total keys.

Fig. 9 pictures the totalizer control mechanism.

Fig. 10 is an exploded perspective of the No. 5 and No. 6 totalizer control line.

Fig. 11 is a detail of the repeat key release bar and an operating lever therefor.

Figs. 12A and B combined form a plan view showing the side spacing of the parts comprising this invention.

Fig. 13 is a view showing the six totalizer lines and an actuator rack therefor.

Figure 14:
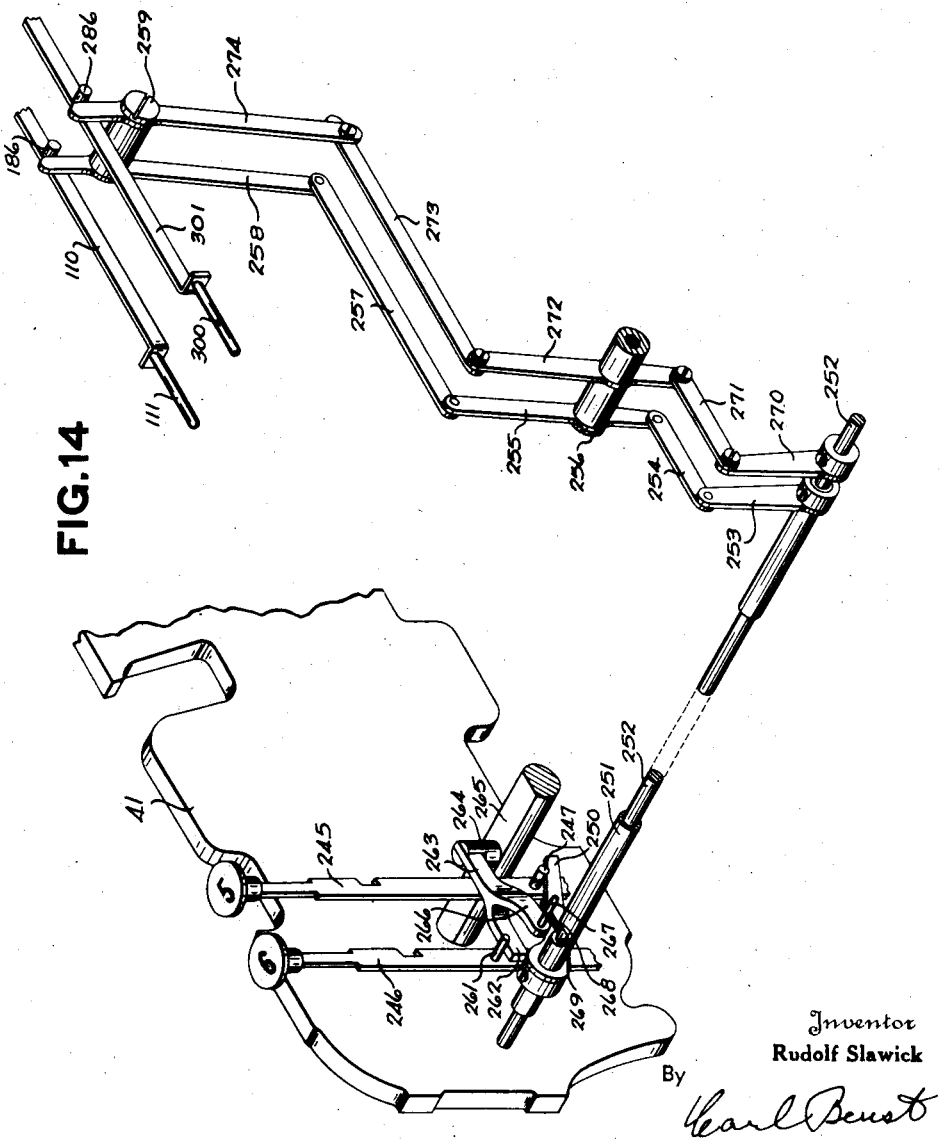

Fig. 14 is a perspective view illustrating a modified form of total key arrangement.

GENERAL DESCRIPTION

The machine of the instant invention is an accounting machine of the well known Ellis type having a traveling carriage, and if desired, may be equipped with typewriter keyboard and type. This machine is operated by a constantly running electric motor of the type shown in United States Patents to N. W. Perkins, No. 1,136,165, granted April 20, 1915, and to F. W. Bernau, No. 1,301,102, issued September 28, 1926. The motor is clutched to the machine operating mechanism by the depression of a starting bar, and is automatically disconnected from said operating mechanism near the end of each cycle of operation.

The keyboard is of conventional adding machine form and is composed of a plurality of flexible amount keys arranged in denominational rows. There is also a row of control keys arranged to exercise control over the different functions of the machine.

The machine in the preferred form has a plurality of totalizers arranged in parallel pairs, one above the other, at the rear of the machine. One or more of said totalizers may, if desired, be arranged for both addition and subtraction. The add-subtract totalizers are equipped with a dual carrying mechanism normally retained in adding position but automatically shifted to subtract position when said totalizers are conditioned for subtract operations. The totalizers are actuated by being engaged with reciprocating racks, which are also adapted to position the accounting machine printing type segments. There is a totalizer wheel, an actuator rack, and a type segment for each denominational row of amount keys. The actuator racks and type segments are positioned for addition and subtraction by depressed amount keys, and in total and sub-total operations they are positioned in the well known manner by the return to zero of the totalizer wheels.

The machine of the instant invention differs from former Ellis machines in that it is equipped with six totalizers rather than four, which has heretofore been the maximum. The totalizers are arranged in units consisting of two totalizers mounted one above the other. The units are in turn assembled to each other in such a manner that the three pairs of totalizers are in horizontal alinement.

The totalizers will be numbered as has heretofore been the custom. The upper totalizers beginning nearest the front of the machine will be called No. 1, No. 3 and No. 5, respectively. The lower totalizers beginning nearest the front of the machine will be called, respectively, No. 2, No. 4 and No. 6. All these totalizers are of conventional Ellis construction, the No. 5 and No. 6 totalizers being substantially duplicates of the No. 3 and No. 4 totalizers. There is a common operating means for engaging the No. 3 and No. 5 totalizers with the actuators, which is also the case with the No. 4 and No. 6 totalizers. Selecting means for coupling the desired totalizer to the operating means have been supplied, and are made effective in adding operations by means of stops arranged as desired upon the traveling carriage. In total and sub-total operations the selecting means are made effective by the depression of total keys. In the description to follow the above mechanism pertinent to the instant invention will be treated in detail.

DETAILED DESCRIPTION

*Totalizer engaging mechanism for adding operations*

Figure 4:
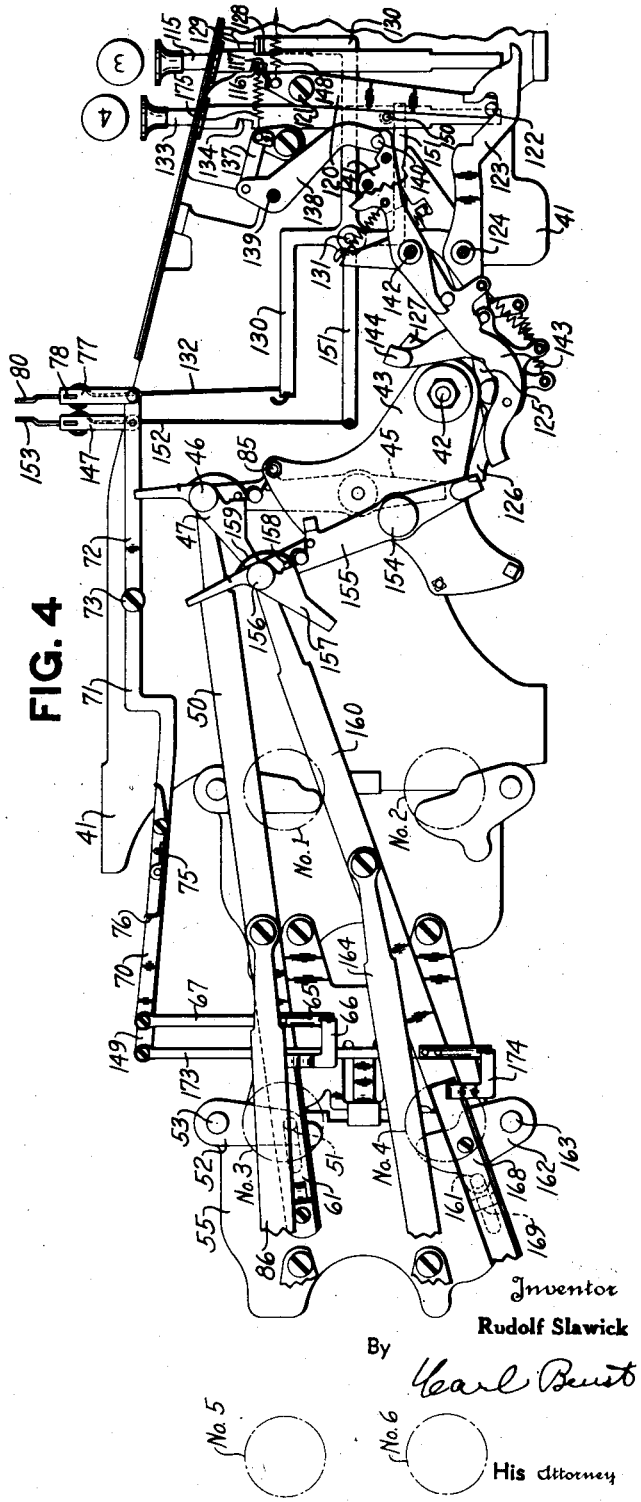
Fig. 4 is a side elevation taken from the left, picturing the mechanism for operating the selective coupling means of the No. 3 and No. 4 totalizers.

As brought out in the preceding general description, the machine of the present invention has six totalizers arranged in parallel pairs, one above the other (Figs. 4 and 13). These totalizers are sequentially numbered, the pair nearest the front being No. 1 and No. 2, the next pair No. 3 and No. 4, and the last pair No. 5 and No. 6.

Journaled in a pair of main frames 40 and 41 (Figs. 12—A and 12—B) is an operating shaft 42 (Figs. 1, 4 and 9) having secured on its left-hand end an operating plate 43. The plate 43 carries a stud 44 upon which is pivoted a flying lever 45 having in its upper end a stud 46. Pivoted on the stud 46 is a pawl 47 urged counter-clockwise against a stop stud 48 by a spring 49. The right end of a link 50 is also pivoted on the stud 46, said link 50 being slotted on its left end to embrace a stud 51 in a crank 52 secured to the left end of a totalizer engaging shaft 53 journaled in a pair of totalizer frames 54 and 55 (Fig. 12A).

Secured to the shaft 53 (Fig. 13) is a pair of symmetrical cam arms 56, (only one here shown), each having therein a cam slot adapted to cooperate with a pair of rollers 57 mounted on either end of a No. 3 totalizer shaft 58. The shaft 58 has turnably mounted thereon a plurality of totalizer wheels 59 adapted to cooperate with a plurality of actuator racks 60 (one only here shown).

Figure 5:
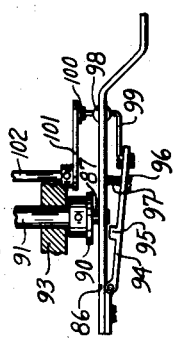
Fig. 5 is a detail view showing a selective coupling latch.

The link 50 (Figs. 1, 4 and 12A) has secured on its left end a hinged latch 61 having a projection 62 adapted to cooperate with the stud 51 in the crank 52 for a purpose to be later described. A screw 63 threaded in the link 50 extends through a clearance hole in the latch 61. A spring 64 wound around the screw 63 holds the latch 61 in ineffective position against the head of the screw 63. Secured to the link 50 is a rod 65 (Figs. 2 and 5) having a slot in which is pivoted a latch operating lever 66, one arm of which is formed to cooperate with the latch 61. The other arm of the lever 66 is pivotally connected by a link 67 (Figs. 1 and 4) to a link 70 pivoted on an arm 71 of a lever 72 pivoted at 73 to the left frame 41. The link 70 has an extension 74 which is held against a stop stud 75 in the arm 71 by a spring 76, thus forming a flexible connection between the arm 71 and link 67. This flexible connection takes care of any variations of the parts in manufacture, thus insuring proper operation of the parts under all conditions. The right-hand arm of the lever 72 is connected by a link 77 to the left arm of a lever 78 (Figs. 3 and 4) pivoted at 79 to a tabulating frame (not shown). The right arm of the lever 78 has an upturned extension 80 adapted to cooperate with a lug 81 on a stop 82 carried by a tabulating bar 83 secured to a traveling carriage (not here shown).

Selection of the No. 3 totalizer for addition is accomplished by tabulating the traveling carriage to a position where the lug 81 (Fig. 3) on the stop 82 will contact the extension 80 of the lever 78, rocking said lever clockwise. This causes the lever 72 (Fig. 1) to rock counter-clockwise, which in turn rocks the lever 66 clockwise (Fig. 2) thereby moving the latch 61 (Fig. 12A) to a position where the lug 62 will be in the path of the stud 51 carried by the No. 3 totalizer engaging arm 52.

Referring to Fig. 1, the shaft 42 and the plate 43 are oscillated through an angle of approximately 60 degrees each time the machine is operated, by mechanism not here shown. However, reference may be had to the patents cited at the beginning of this specification for a complete description of this mechanism. The initial clockwise movement of the plate 43 causes the lower end of the pawl 47 to engage a square stud 84 in the plate 43, thereby causing the lug 62 to engage the stud 51 to rock the crank 52, shaft 53 and cam 56 (Fig. 13) counterclockwise to engage the No. 3 totalizer wheels 59 with the actuator racks 60 for an adding operation. The return or counterclockwise movement of the plate 43 causes a stud 85 secured in said plate 43 to engage the lever 45 to lock the crank 52, shaft 53 and cam 56 clockwise to disengage the totalizer wheels from the actuator racks 60 near the end of the operation of the machine.

Pivoted on the link 50 (Fig. 1) is another link 86 having a slot through which extends a stud 87 in a crank 90 secured to a No. 5 totalizer engaging shaft 91 journaled in a pair of totalizer frames 92 and 93 (Figs. 1 and 12B). Secured to the rear end of the link 86 is a hinged latch 94 similar to the latch 61, and having a lug 95 adapted to cooperate with the stud 87. A screw 96 threaded in the link 86 extends through a clearance hole in the latch 94. A compression spring 97 coiled around the screw 96 holds the latch 94 in ineffective position against the head of the screw 96.

Secured to the link 86 is a rod 98 having a slot in which is pivoted a lever 99, one arm of which is formed to cooperate with the latch 94. The other arm of the lever 99 is pivotally connected by a link 100 to a crank 101 (Figs. 1 and 12B) fast on a shaft 102 journaled in the totalizer frames 92 and 93. Secured to the shaft 102 is an arm 103 pivotally connected to a flexible link 104 composed of bars 105 and 106 flexibly coupled to each other by means of a spring 107. The bar 106 (Figs. 1 and 6) is pivoted to a lever 108 pivoted at 109 to the right frame 40. A bar 110 is also pivoted to the lever 108 (Figs. 1 and 12B) and has its forward end formed and threaded to receive an adjustable screw pin 111 secured by a nut 112. The pin 111 extends through a hole in a tabulating frame 113, and is adapted to cooperate with a No. 5 totalizer adding stop 114 (Figs. 1 and 3) carried by the stop bar 83.

To select the No. 5 totalizer for addition it is necessary to tabulate the traveling carriage to a position where the stop 114 (Figs. 1 and 3) will engage the pin 111, forcing it and the bar 110 toward the rear of the machine, to rock the lever 108 counter-clockwise, which, through the link 104, rocks the arm 103, shaft 102 and crank 101 clockwise, whereupon link 100 rocks the lever 99, which moves the latch 94 to a position where the lug 95 will be in the path of the stud 87. Initial movement clockwise of the shaft 42 (Fig. 1) and plate 43, as explained above, moves the link 86 toward the front of the machine, causing the lug 95 to contact the stud 87 and rock the crank 90 and engaging shaft 91 counter-clockwise, whereupon cam arms 89 (Fig. 13—only one arm being shown) fixed to the shaft 91 rock the No. 5 totalizer wheels 59 into engagement with the actuator racks 60 to add in the No. 5 totalizer. The return counter-clockwise movement of the shaft 42 and plate 43 causes the totalizer wheels to be disengaged from the actuator racks near the end of the machine operation.

The mechanisms for engaging the No. 4 and No. 6 totalizers with the actuators in adding operations is substantially a duplicate of and operates in exactly the same manner as the No. 3 and No. 5 engaging mechanisms, respectively, explained above.

In Fig. 3 is shown a hanging bar lever 153 associated with the No. 4 totalizer. To this lever 153 is connected a link 147 (Figs. 1, 4, 12A and 12B), which is in turn connected to a lever 172. This lever 172 is connected by a flexibly mounted bar 149 to a link 173 attached to a lever 174 which cooperates with a latch 168 on a link 160. The latch 168 has a projection 169 arranged to cooperate with a stud 161 in a crank 162 secured to a shaft 163. The link 160 is pivoted on a stud 156 on a flying lever 155 mounted at 154 on the plate 43. This lever 155 is common to both the No. 4 and No. 6 totalizers. Pivoted on the lever 155 is a pawl 157 normally urged counter-clockwise against a stop stud 158 by a spring 159. A stud 146 on the operating lever 43 is adapted to cooperate with the lower end of the pawl 157, as the lever 43 rocks clockwise. When the stud 146 reaches the pawl 157, continued movement of the lever 43 causes said stud 146 to effect a forward movement of the upper end of the flying lever 155 to draw the link 160 forwardly in the usual and well known manner, as set forth in the previously mentioned Ellis patents.

The latch 168 is similar to the latch 61, and when the lever 153 (Fig. 3) is operated by a stop 82, the parts 147, 172, 149, 173 and 174 (Fig. 1) actuate the latch 168 to move its projection 169 into the path of the stud 161. Therefore, when the link 160 is moved towards the front of the machine upon operation of the driving plate 143, the crank 162, shaft 163 and cam arms 148 (Fig. 13) fixed to said shaft (only one arm being shown), engage the No. 4 totalizer with and disengage it from the racks 60.

For engaging the No. 6 totalizer during adding operations there is provided a screw pin 300 (Figs. 3 and 12B) mounted like the pin 111 and adapted to be depressed by any stop 114 on the tabulating bar 83.

The pin 300 is carried by a bar 301 (Fig. 12B) pivoted to a lever 302 (Fig. 12A) mounted in axial alinement with the lever 108. Also connected to the lever 302 is a flexible link 303 consisting of bars 304 and 305 and a spring 306. The bar 305 (Figs. 1 and 12A) is connected to an arm 307 fixed to a shaft 308 mounted in the frames 92 and 93. Also secured to the shaft 308 is an arm 309 connected by a link 310 to a lever 311 pivoted in a stud 312 carried by a link 164 connected to the previously described link 160.

The link 164 (Fig. 1) is slotted at its rear end to receive a stud 165 in a crank 166 secured to a No. 6 totalizer engaging shaft 167 journaled in the frames 92 and 93, and having fixed thereto cam arms 179 (Fig. 13—only one arm being shown). The link 164 carries a hinged latch 170 which has a projection 171 arranged to cooperate with the stud 165 in the crank 166. The latch 170 is similar to the latch 94, explained above, and in adding operations when one of the stops 114 presses the pin 300 inwardly, or towards the rear of the machine, the train of mechanism consisting of the parts 301 to 312 forces the latch 170 towards the link 164 (Fig. 4) and places the projection 171 in the path of the stud 165. Now when the operating plate 43 is oscillated, the flying lever 155, through the pawl 157, links 160 and 164, and latch 170, oscillates the crank 166 and shaft 167, whereupon cam arms 179 (Fig. 13—only one arm being shown) engages the No. 6 totalizer with and disengages it from the racks 60.

*Engaging mechanism for the No. 3 and No. 4 totalizers in total operations*

Calling attention to Fig. 4, a No. 3 total key 115 has therein a notch 116 adapted to cooperate with a lug 117 on a latch 120 pivoted at 121 to the left frame 41. The latch 120 has in its lower end a stud 122 adapted to cooperate with a total cam 123 pivoted on a stud 124 extending between the left frame 41 and a sub-frame 119 (Fig. 12B). Also pivoted on the stud 124 (Fig. 4) and operatively connected to the total cam 123 is a total cam lever 125 having pivoted thereon a pair of pawls 126 and 127 arranged to cooperate with the lower end of the flying lever 45, for a purpose to be described later. The key 115 also has another notch 128 arranged to cooperate with a projection 129 formed on the forward end of a lever 130 pivoted on a stud 131 carried by the left frame 41. The rear end of the lever 130 is connected by a rod 132 to the lever 78.

Depression of the No. 3 total key 115 (Fig. 4) through the notch 128 and projection 129 rocks the lever 130 clockwise. The rod 132 coacting with the lever 78 rocks the lever 72 counterclockwise to move the lug 62 on the latch 61 into the path of the stud 51 in the crank 52. Depression of the No. 3 total key 115 also moves the notch 116 opposite the lug 117, allowing the latch 120 to be forced clockwise by a spring 148. This causes the stud 122 to engage the cam 123, rocking it and the lever 125 clockwise to move the pawls 126 and 127 into the path of the flying lever 45. Therefore, oscillation of the plate 43 during machine operations, as explained above, through the medium of link 50, latch 61, crank 52, shaft 53 and cam arms 56, causes the No. 3 totalizer (Fig. 13) to be properly engaged with and disengaged from the racks 60 during a total taking operation.

Figure 6:
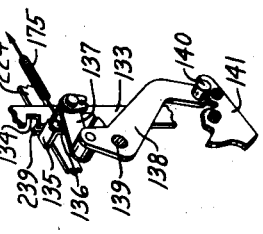
Fig. 6 is a perspective of the No. 4 total key and its latch mechanism.

Referring to Figs. 4 and 6, a No. 4 total key 133 has a notch 134 arranged to receive a lug 135 on a latch 136 pivoted to the left frame 41. The latch 135 is connected by a link 137 to a lever 138 pivoted at 139 to the left frame. The lower end of the lever 138 carries a stud 140 which cooperates with a total cam 141 pivoted on a stud 142 extending between the frames 41 and 119. Pivoted on the stud 142 and operatively connected to the total cam 141 is a total cam lever 143 which carries a pawl 144. The left end of the lever 143 and the pawl 144 are adapted to cooperate with the lower end of the flying lever 155 for the No. 4 and No. 6 totalizers. The key 133 (Fig. 4) carries near its lower end a stud 150 arranged to engage the front arm of a lever 151 pivoted on the stud 131. The rear arm of the lever 151 is connected by a rod 152 to the lever 153 (Figs. 1, 3 and 4), previously described.

Depression of the No. 4 total key 133 (Figs. 4, 12A and 12B) through the stud 150, lever 151, rod 152, lever 153, lever 172, and link 173 rocks the lever 174, whereupon the latter moves the latch 168 so that the projection 169 (Fig. 4) thereon will be in the patch of the stud 161 in the engaging crank 162. Depression of the total key 133 (Figs. 4 and 6) also allows the lever 138 to be rocked clockwise by a spring 175, which also rocks the lever 143 and pawl 144 clockwise into the path of the flying lever 155. Thus, oscillation of the operating plate 43 during the machine operation, through the medium of the link 160, latch 168, crank 162, shaft 163 and cam arms 148, causes the No. 4 totalizer to be properly engaged with and disengaged from the actuator racks 60 for a total operation.

*Engaging mechanism for the No. 5 and No. 6 totalizers in total operations*

An angle plate 176 (Figs. 7 and 12B) secured to the right frame 40 carries a No. 5 total key 177 and a No. 6 total key 178. The total key 177 has a stud 180 which cooperates with an extension on a lever 181 pivoted on a stud 182 in the plate 176. The upper end of the lever 181 is connected by a link 183 to the lower end of lever 184 pivoted on a stud 185 secured in a right-hand printer frame 179. The upper end of the lever 184 is adapted to cooperate with a stud 186 in the bar 110 to select the No. 5 totalizer for a totalizing operation.

The lower end of the No. 5 total key 177 (Figs. 7 and 10) is arranged to cooperate with an extension of an arm 187 secured to the right-hand end of a sleeve 188 carried by a shaft 190 journaled in the main frames 40 and 41 (Figs. 12A and 12B). Secured to the left-hand end of the sleeve 188 (Figs. 9 and 10) is a forked arm 191, the tines 192 and 193 of which carry, respectively, studs 194 and 195. The studs 194 and 195 embrace an arm 196 pivoted at 197 to the frame 41. The lower end of the arm 196 carries a stud 200 arranged to cooperate with the previously described total cam 123 for a purpose to be later described. A spring 198 normally holds the parts in the positions shown.

Depression of the No. 5 total key 177 (Figs. 7 and 12B), through the stud 180, lever 181, link 183 and lever 184, forces the bar 110 toward the rear of the machine. This rocks the lever 108 counter-clockwise, which, through the link 104 (Fig. 1), arm 103, shaft 102, link 100 and lever 99, moves the latch 94 inwardly so that the lug 95 will be in the path of the stud 87 in the No. 5 engaging crank 90.

Depression of the No. 5 total key 177 (Figs. 7 and 9) also rocks the arm 187, sleeve 188 and forked arm 191 counter-clockwise. This causes the studs 194 and 195 to rock the arm 196 clockwise, whereupon the stud 200 rocks the total cam 123 clockwise. This moves the usual pawls 126 and 127 (Fig. 4) into the path of the flying lever 45.

With the lug 95 (Fig. 1) in the path of the stud 87, and with the pawls 126 and 127 in the path of the flying lever 45, upon clockwise movement of the operating plate 43, the links 50 and 86 are immediately drawn forwardly, thus rocking the crank 90, shaft 91, and cam arm 89 (Fig. 13) counter-clockwise, which meshes the No. 5 totalizer wheels 59 with the racks 60 for totalizing purposes.

After the No. 5 totalizer is cleared the lever 43 is returned home, during which time the pawl 127 causes the flying lever 45 to return the links 50 and 86 to normal to disengage the totalizer from the racks 60. Upon restoration of the key 177 by means later described, the spring 199 restores the parts 187, 188, 191 and 196 to normal.

The No. 6 total key 178 carries a stud 280 (Figs. 7 and 12B) cooperating with a lever 281 pivoted on a stud 282 in the plate 176. The lever 281 is connected by a link 283 to a lever 284, like the lever 184, and shown only in Fig. 12B. The lever 284 is pivoted on the stud 185, and its upper end cooperates with a pin 286 in the bar 301.

The lower end of the No. 6 total key 178 (Figs. 7, 9 and 10) is arranged to cooperate with an extension of an arm 201 secured to the right-hand end of the shaft 190. Fast on the left end of the shaft 190 is a lever 202 having an arm 203 connected by a link 204 to an arm 205 pivoted at 206 to the left frame 41. A spring 199 holds the parts associated with the lever 201 normally in the positions shown in Figs. 7, 9, and 10. The arm 205 carries a stud 207 which is arranged to coact with the total cam 141 for a purpose to be hereinafter described. The lever 202 has an arm 207 arranged to engage a stud 208 in a usual repeat key release lever 218 (Fig. 11) to release the usual repeat key (not shown herein).

Depression of the No. 6 total key 178 (Figs. 7 and 12B) through the stud 280 lever 281, link 283, and lever 284, forces the bar 301 towards the rear of the machine, which, through the lever 302, link 303 (Fig. 12A), arm 307 (Fig. 1), shaft 308, arm 309, link 310 and lever 311, moves the latch 170 and places its projection 171 into the path of the stud 165 on the No. 6 totalizer engaging crank 166.

Depression of the No. 6 total key 178 (Figs. 7 and 9) also rocks the arm 201, shaft 190 and lever 202 counter-clockwise, which, through the link 204 rocks the arm 205 clockwise. This causes the stud 207 in the arm 205 to engage and rock the No. 6 total cam 141 clockwise, moving the lever 143 and the pawl 144 (Fig. 4) into the path of the flying lever 155.

With the projection 171 (Fig. 1) in the path of the stud 165, and with the lever 143 and pawl 144 in the path of the flying lever 155, the clockwise movement of the operating lever 43 will draw the links 169 and 164 forwardly, thereby rocking the crank 166, shaft 167 and cam arm 179 (Fig. 13) clockwise to engage the No. 6 totalizer wheels with the racks 60 for totalizing purposes.

Restoration of the lever 43 reverses the movements of the links 160 and 164, thus disengaging the totalizer from the racks.

Total key releasing means

In the instant machine the means for releasing the Nos. 1, 2, 3, and 4 total keys in total and sub-total operations is similar to that of former Ellis machines shown in the previously mentioned patents. However, new mechanism has been devised for releasing the Nos. 5 and 6 total keys 177 and 178, which means is operatively connected to the usual releasing means referred to above. In the description to follow the new releasing mechanism and as much of the conventional releasing mechanism as is necessary, will be described.

Referring to Figs. 7 and 8, the studs 182 and 282 carried by the plate 176 have pivoted thereon a pair of latches 210 and 211, each of which has a lug 212 adapted to cooperate with notches 213 and 214 in the total keys 177 and 178. The lugs 212 are also arranged to be engaged by projections 215 and 216 respectively, on a release bar 217, slidably mounted on the plate 176. The bar 217 has pivotally connected thereto an arm 220 secured to a shaft 221 journaled in the frames 40 and 41 (Fig. 12B). Secured to the left end of the shaft 221 (Fig. 9) is an arm 222 having therein a hole through which extends a stud 223 fast in a usual total release bar 224. Directly back of the total release bar 224 is a usual sub-total release bar 225 reciprocably mounted at its rear end on a stud 226 in a sub-total release lever 227 pivoted to the left frame 41, and at its front end on a stud 228 fast in an arm 229 also pivoted to the frame 41. The total release bar 224 is likewise reciprocably mounted by having therein a slot which embraces the stud 226 in the lever 227 and another slot which embraces the stud 228 in the arm 229.

The total release bar 224 has pivoted thereon a lever 230 held in a neutral position by a spring 231. The upper end of the lever 230 is notched to cooperate with a stud 232 carried by the frame 41. The lower end of said lever 230 is arranged to cooperate with a stud 233 in an operating plate 234 secured to the shaft 42.

The operating plates 234 and 43 are symmetrical in outline and function in exactly the same manner. The plate 234 has therein two studs 235 and 236, having respectively pivoted thereon two flying levers 237 and 238, which operate to engage the No. 1 and No. 2 totalizers with the actuator racks 60 in the usual and well known manner.

The stud 235 extends through the plate 234 and is arranged to engage the lower end of the sub-total release lever 227. The total release bar 224 has a plurality of projections 239 (Figs. 6 and 9), one of which projections is arranged to cooperate with the lug 117 on the Nos. 3 and 5 latch 120, and another to cooperate with the lug 135 on the No. 4 and No. 6 latch 136. The release bar 224 (Fig. 9) carries a stud 240 and the release bar 225 carries a stud 241, both of which are adapted to cooperate with a wedge 242 pivoted on a sub-total key 243. A weak spring 244 is tensioned to urge the release bar 224 toward the rear of the machine in order to hold the projections 239 in contact with the lugs 117 and 135.

As the operating plate 234 (Fig. 9) makes its initial movement clockwise in total operations, the stud 233 wipes past the lower end of the lever 230. The return movement counter-clockwise of the plate 234 causes the stud 233 to engage the lever 230, forcing its upper end against the stud 232 to move the release bar 224 toward the rear of the machine. This causes the projections 239 on said bar 224 to rock the latches 120 and 136 counter-clockwise to release either the No. 3 or No. 4 total keys, depending upon which one had been previously depressed. Upon being released, the depressed No. 3 or No. 4 total key is returned upward to normal position by means of compression springs (not here shown).

The rearward movement of the bar 225 rocks the arm 222, shaft 221 and arm 220 (Fig. 7) counter-clockwise, moving the release bar 217 rearwardly, causing the projections 215 and 216 (Fig. 8) to engage the lugs 212, rocking the latches 210 and 211 counter-clockwise to release either the No. 5 or No. 6 total key 177 or 178, depending upon which one had been previously depressed. A compression spring 248 then returns said key upward to its normal position.

In total operations the totalizer wheels are disengaged from the actuators as soon as they have been returned to zero. This is accomplished by means of the pawls 127 and 144 (Fig. 4) engaging their respective flying levers 45 and 155 on the return movement of the operating plate 43. In sub-total operations initial movement of the plate 43 releases the depressed total key, lowering the pawls 127 and 144 out of the path of their respective flying levers 45 and 155, thus retaining the totalizer wheels in mesh with the actuator racks 60, which causes said totalizer wheels to be returned to their original condition prior to such sub-total operation.

A sub-total operation is effected by depressing the sub-total key 243 (Fig. 9) in conjunction with the total key of the totalizer which it is desired to sub-totalize. Depression of the sub-total key 243 forces the wedge 242 between the studs 240 and 241 in the release bars 224 and 225. Initial movement clockwise of the plate 234 causes the extended end of the stud 235 to engage the lever 227 to rock the release bar 225 rearward, which, through the wedge 242, studs 240 and 241, causes the release bar 224 to move in unison therewith, thus releasing the depressed total key and the sub-total key. This lowers the pawls 127 and 144 out of the path of their respective flying levers 45 and 155, allowing the wheels of the selected totalizer to remain in mesh with actuator racks 60 until they are restored to their original condition.

Modified form

Fig. 14 illustrates a modified form of totalizer selecting mechanism for the No. 5 and No. 6 totalizers in which the total keys are mounted on the left side of the keyboard. All of the mechanism not illustrated is similar to that of the preferred form, which was treated somewhat at length hereinbefore. The modified form of total key arrangement will now be explained.

Mounted just inside the left frame 41 (Fig. 14) is a No. 5 total key 245 and a No. 6 total key 246. These keys are connected to the totalizer engaging mechanism by mechanism similar to that of the preferred form described above; therefore, it is felt unnecessary to again illustrate or describe this mechanism. The No. 5 total key 245 carries a stud 247 arranged to cooperate with an arm 250 secured to a sleeve 251 turnably mounted on a shaft 252 journaled in the frames 40 and 41. Secured on the right-hand end of the sleeve 251 is an arm 253 connected by a link 254 to a lever 255 pivoted on a stud 256 carried by the right frame 40. The lever 255 is connected by a link 257 to another lever 258 pivoted on a stud 259 fast in the right printer frame 179. The upper end of the lever 258 cooperates with the stud 186 in the bar 110 (Figs. 1 and 7). From this point on the mechanism is identical to that of the preferred form, with the following exception.

In the modified form the bar 110 and connecting mechanisms for the No. 5 totalizer selecting latch mechanism have been switched with the No. 6 mechanism, so that the No. 6 mechanism is on the extreme right and the No. 5 mechanism is just to its left.

Depression of the No. 5 key 245 rocks the arm 250, sleeve 251, and arm 253 clockwise, which through the link 254, lever 255, link 257 and lever 258, forces the bar 110 toward the rear of the machine. This moves the latch 94 (Fig. 1) to its effective position where the lug 95 is in the path of the stud 87 carried by the No. 5 engaging crank 90, whereupon oscillation of the plate 43 effects the engagement and disengagement of the No. 5 totalizer, with and from the racks 60, in the manner previously described.

The No. 6 total key 246 (Fig. 14) carries a stud 261, which cooperates with a finger 262 of a Y-shaped arm 263 pivoted to a slotted stud 264 carried by a usual front rack bar 265 rigidly mounted between the frames 40 and 41. Another finger 266 of the arm 263 has therein a stud 267 arranged to cooperate with another stud 268 secured in the shaft 252 and extending through an opening 269 in the sleeve 251. The right end of the shaft 252 carries an arm 270 connected by a link 271 to a lever 272 pivoted on the stud 256. A link 273 connects the lever 272 to another lever 274 pivoted on the stud 259. The upper end of the lever 274 cooperates with the stud 286 on the bar 301 associated with the No. 6 totalizer selecting latch mechanism previously described.

Depression of the No. 6 total key 246 (Fig. 14) through the stud 261, the Y-shaped arm 263, stud 267 and the stud 268, rocks the shaft 258 and arm 270 clockwise, which through the link 271, lever 272, link 273 and lever 274, forces the bar 301 and its associated No. 6 totalizer selecting mechanism rearward, moving the latch 170 (Fig. 1) to effective position where the lug 171 is in the path of the stud 165 in the engaging crank 166. Oscillation of the plate 43 during machine operation then causes the selected No. 6 totalizer to be properly engaged with and disengaged from the actuator rack 60 in the same manner as herein before set out.

In summarizing briefly it will be seen: That two totalizers have been added to the instant machine, making in all six totalizers; that the No. 3 and No. 5 totalizers are engaged with the actuators by a common engaging mechanism which is likewise true of the No. 4 and No. 6 totalizers; that each of the totalizers, Nos. 3, 4, 5 and 6, is equipped with a selecting latch mechanism operated for addition by stops arranged on the traveling carriage and operated by means of keys in total and sub-total operations.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a plurality of totalizers; actuators therefor; a device associated with each totalizer for engaging the same with and disengaging it from said actuators; normally disconnected operating means for said devices; a rockable latch member associated with each of said engaging devices and carried by the operating means, said latches being normally disconnected from the engaging and disengaging devices; a plurality of projecting members carried by the operating means; a lever carried by each of said projecting members and adapted when operated to move its associated latch into effective position relative to its engaging and disengaging means; a traveling carriage; and mechanisms connected to said levers and leading to the traveling carriage to be operated thereby to actuate either of said levers.

2. In a machine of the class described, the combination of a totalizer; an actuator therefor; a device for engaging the totalizer with and disengaging it from said actuator; operating means for said device but normally disconnected therefrom; a projection carried by said device; a rockable coupling member carried by said operating means; means for maintaining said coupling member normally in an ineffective position relative to the engaging and disengaging device; a lever supported by said operating means to rock the coupling member to bring it into cooperative relation with the projection on the engaging and disengaging device to couple the latter with said operating means; and means for operating said lever.

RUDOLF SLAWICK.